(12) United States Patent
Ahlfors et al.

(10) Patent No.: US 6,944,171 B2
(45) Date of Patent: Sep. 13, 2005

(54) SCHEDULER METHOD AND DEVICE IN A SWITCH

(75) Inventors: Ulf Ahlfors, Kävlinge (SE); Anders Fyhn, Malmö (SE); Peter Tufvesson, Lund (SE)

(73) Assignee: Switchcore, AB, Lund (SE)

( * ) Notice: Subject to any disclaimer, the term of this patent is extended or adjusted under 35 U.S.C. 154(b) by 865 days.

(21) Appl. No.: 09/804,591

(22) Filed: Mar. 12, 2001

(65) Prior Publication Data

US 2002/0126683 A1 Sep. 12, 2002

(51) Int. Cl.[7] .............................................. H04L 12/56
(52) U.S. Cl. .................................. 370/412; 370/395.4
(58) Field of Search ............................. 370/235, 235.1, 370/395.4, 395.41, 412, 413, 417, 418, 428

(56) References Cited

U.S. PATENT DOCUMENTS

| | | | |
|---|---|---|---|
| 5,231,633 A | | 7/1993 | Hluchyj et al. |
| 5,268,900 A | | 12/1993 | Hluchyj et al. |
| 5,596,576 A | | 1/1997 | Milito |
| 5,831,985 A | | 11/1998 | Sandorfi |
| 5,926,458 A | | 7/1999 | Yin |
| 2002/0136230 A1 | * | 9/2002 | Dell et al. ................. 370/416 |

OTHER PUBLICATIONS

Lynn, M.S., et al.: *The Priority Token Bank in a Network of Queues*, 1997 IEEE International Conference on Communications, Part vol. 3, p. 1387–91, ISBN 0 7803 3925 8.
Dimitrios, et al.: *Latency–Rate Servers: A General Model for Analysis of Traffic Scheduling Algorithms*, IEEE/ACM Transactions n Networking, vol. 6, No. 5, Oct. 1998.

* cited by examiner

Primary Examiner—Chi Pham
Assistant Examiner—Derrick W Ferris
(74) Attorney, Agent, or Firm—Pillsbury Winthrop et al

(57) ABSTRACT

The invention relates to a scheduler method and device for handling output queues in a switch. The invention incorporates a number of co-operating techniques such as weighted and deficit driven round-robin and interleaving. The invention provides a scheduling method in a switch in which an input data stream is received and stored in a number of output queues, the method comprising the steps of: polling all queues in order; if the polled queue contains data, refilling a deficit value indicating a maximum amount of data that may be sent from this queue; if the deficit value permits, sending data, and decreasing the deficit value a corresponding amount for the polled queue, else disabling the queue; if any queue is permitted to send after all the queues have been polled, going to a local round, else start polling the first queue of the order again. The invention enables e.g. priority treatment of queues, fairness with regard to varying packet lengths and avoids burstiness.

18 Claims, 2 Drawing Sheets

SCHEDULER METHOD AND DEVICE IN A SWITCH

FIELD OF THE INVENTION

The present invention relates to a scheduler method and device for handling output queues in a switch. The invention incorporates a number of co-operating techniques such as weighted and deficit driven round-robin and interleaving. The invention enables e.g. priority treatment of queues, fairness with regard to varying packet lengths and avoids burstiness.

STATE OF THE ART

The task of the scheduler is to select packets from a number of queues for sending on an output port. In the art a number of problems has been identified:

A. The queues can have different weights, meaning that a queue having a high weight is served longer at a time or more often than other queues. On the other hand, it is not desired to totally block queues having low weight.

B. The length of the data packets may vary and the scheduler should take this into account.

C. A packet may arrive in a queue just after the queue has been polled. Then it should be possible to insert the packet without having to wait too long.

D. It is desired to avoid a bursty signal on the output line, i.e. packets from the same queue arriving to closely packed. Instead it is desired to spread the traffic between the queues in order not to cause any problems e.g. in down-stream switches.

E. It is also desired to avoid a static allocation of polling orders and complicated markings of packets as well as computation of departure times.

In the prior art, techniques have been developed to organize the queue management and to solve these problems. Each technique may solve some of the problems but not all. The prior methods are described below.

The simplest way is to poll all queues in a round-robin fashion, i.e. polling each queue in order and each queue is permitted to send one packet at a time. This avoids the burstiness problem, but the other problems remain.

In a method called weighted round robin the queues may have different priorities or weights. The weights are accomplished by assigning a different number of time slots to each queue. The queue having the highest priority gets the greatest number of time slots. All the time slots are arranged in a round. The queues are allowed to send one packet at a time each time they are polled. The time slots are arranged in a fixed order such that the queues are spread out and bursty signals are avoided. This method solves the problems A and D but not the problems B and C.

Another way to accomplish prioritization is provided by the method called deficit driven round-robin. Instead of assigning time slots each queue is assigned a deficit or credit with a number of bits that is the maximum amount of bits the queue is allowed to send during a round. The deficit is set in accordance with the weight or priority of the queue. The queues are polled in order and send as many bits as they can in accordance with the deficit. After each round the deficit is refilled. This method solves the problems A and B but not the problems C and D.

As examples of the weighted and deficit driven round-robin methods we can mention U.S. Pat. Nos. 5,232,633 and 5,268,900.

The present invention solves all the above problems A to E by combining weighted round-robin and deficit driven round-robin and further enhancing the method by a kind of time sharing or interleaving to decrease burstiness. To each queue a deficit value is assigned in a weighted manner. The deficit value is decreased when packets are sent. This takes care of problems A and B. Furthermore, each queue has a flag indicating how to treat the queue. The flag depends on the deficit value and the contents of the queue. The queues are polled in order and each queue having a flag, indicating that the queue is permitted to send, will send a packet. If any queue is still permitted to send after all the queues have been polled, a smaller round is created involving only a smaller part of all the queues. If any queue receives data it does not have to wait for a complete round before it is permitted to send the data. This solves the problem C. Within the local rounds, the queues are still polled in order which solves the problem D. The invention requires only a few, simple and dynamic calculations. By implementing the invention in this more software-oriented way than the prior art, the problem E is avoided.

Thus, the invention is advantageous over the prior art in that all the problems A to D are solved at the same time.

SUMMARY OF THE INVENTION

The invention provides a scheduling method in a switch in which an input data stream is received and stored in a number of output queues, the method comprising the steps of:

polling all queues in order;

if the polled queue contains data, refilling a deficit value indicating a maximum amount of data that may be sent from this queue;

if the deficit value permits, sending data, and decreasing the deficit value a corresponding amount for the polled queue, else disabling the queue;

if any queue is permitted to send after all the queues have been polled, going to a local round, else start polling the first queue of the order again.

The invention also provides a scheduling device to perform the method.

The invention is defined in the accompanying claims below.

BRIEF DESCRIPTION OF THE DRAWINGS

The invention will be described in detail below with reference to the accompanying drawings, in which.

DETAILED DESCRIPTION OF PREFERRED EMBODIMENTS

The invention is applicable in a switch in a fast packet network. The switch inter-connects different nodes and is responsible for routing packets to correct destinations. The mechanisms of sorting, routing, buffering and packet discarding are well known in the art and do not form any parts of the present invention.

Figure 1:
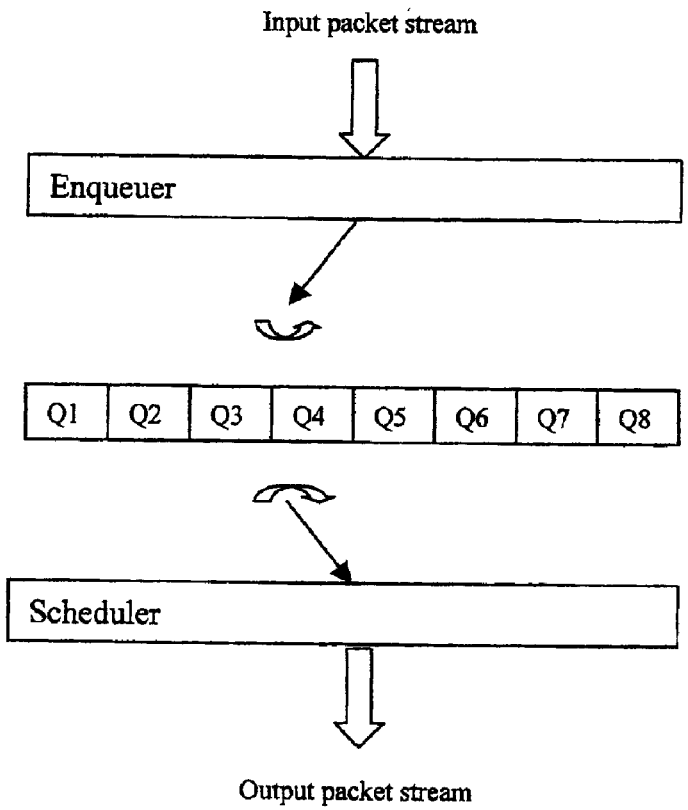
FIG. 1 is a block diagram of switch components relevant to the invention.

The invention is focused on the scheduler, whose task it is to select packets from internal queues in the switch for forwarding to output ports. FIG. 1 is a schematic illustration of the switch components relevant to the present invention. An enqueuer mechanism receives an input packet stream and sorts the packets to store them in a number of queues, here 8 queues, Q1 to Q8. The scheduler selects packets from the queues and sends packets to output ports for forming the output packet stream or streams.

Figure 2:
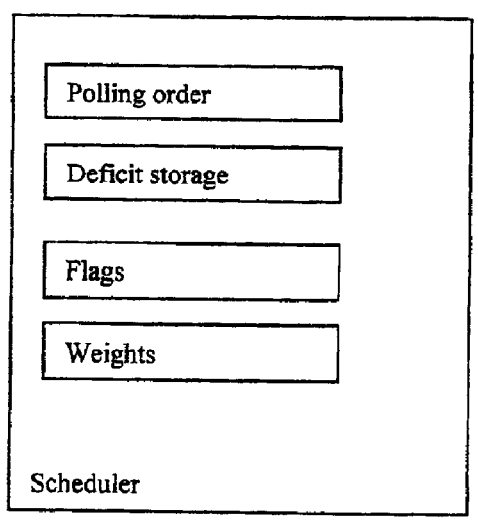
FIG. 2 is a block diagram of the scheduler according to the invention.

The scheduler performing the method according to the invention is schematically shown in FIG. 2. The scheduler has means for storing the polling order in which the queues are to be selected. The polling order can be fixed but is preferably variable so that the order may be changed between global and local rounds to avoid burstiness. The scheduler keeps a deficit storage for each queue storing the amount of deficit, i.e. the maximum amount that the queue is permitted to send during a round. The deficit of each queue may be refilled at the beginning of each round. However, according to the invention it is preferred that the deficit value is refilled only if the queue is not empty. In this way, it is avoided that the deficit is built up each round if the queue does not have anything to send.

A flag is assigned to each queue. The flag is adapted to assume one of three possible values indicating different states:

a first value (Enabled) meaning that the queue has no data to send but may still receive sufficient deficit;

a second value (Active) meaning that the queue has data to send and a sufficient deficit to send some data;

a third value (Disabled) meaning that the queue is not permitted to send any data.

A weight is associated with each queue. The weight determines how much the deficit value is refilled, e.g. new deficit value=previous deficit value+weight. The weights make it possible to prioritize some queues over others.

Figure 3:
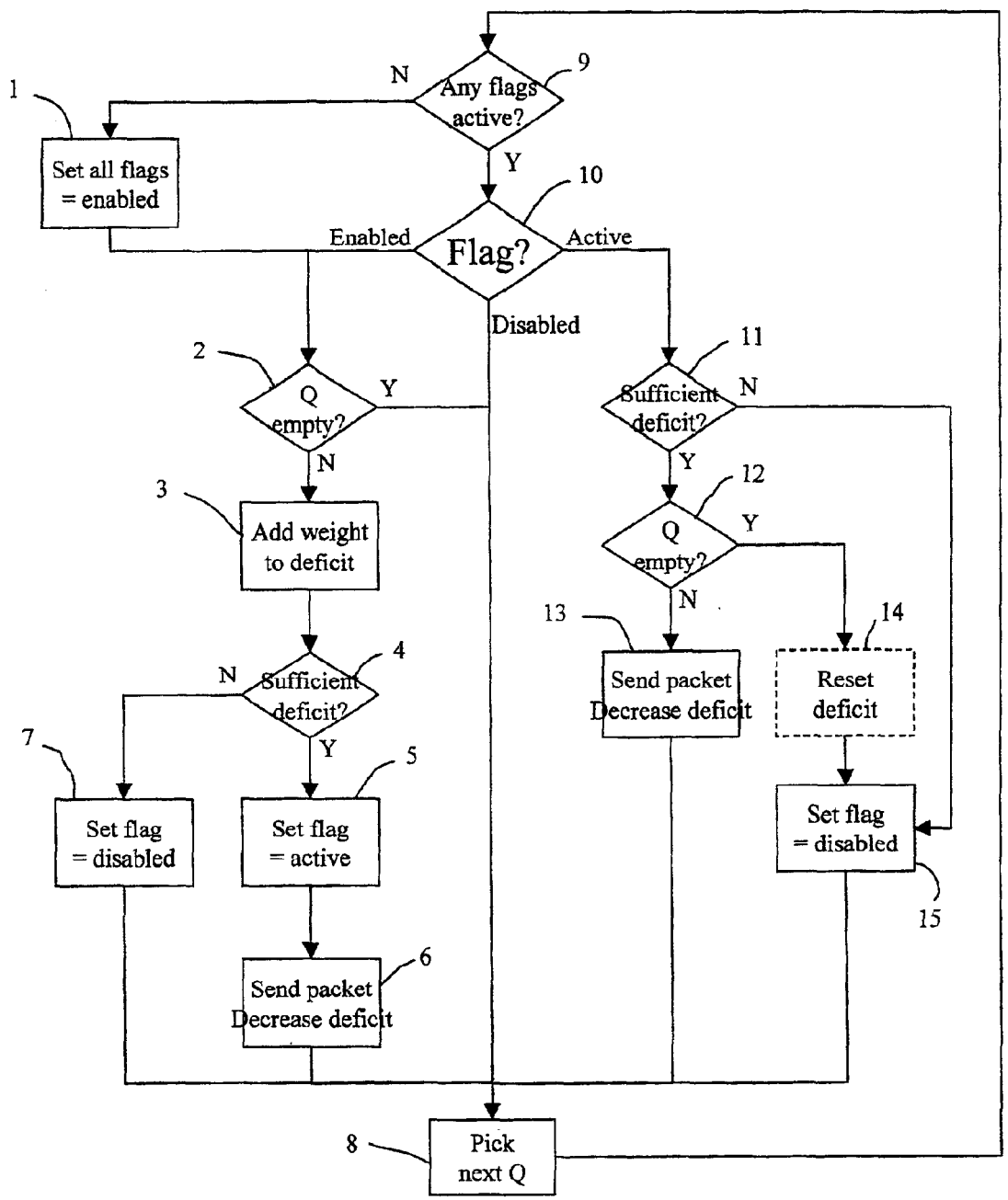
FIG. 3 is a flow chart of a preferred embodiment of the method according to the invention.

FIG. 3 shows a flow chart of an embodiment of the invention. Initially, the configuration parameters of the scheduler are set. A polling order is e.g. Q1, Q2, ... Q8; the deficit value may be zero for all queues; flags should be enabled for all queues; and the weights are set according to the priority of each queue.

Since no queue is active the procedure will start at box 1, which sets all flags=enabled. This is also the start of all subsequent global rounds.

In box 2 it is determined if a queue is empty, i.e. if the queue in question has received any data to send since the last round, global or local.

If the queue has received data, the deficit value is refilled in box 3, i.e. the weight of a queue is added to the deficit value.

In box 4 it is determined if the deficit value is large enough to send any data. The preferred condition is: deficit value≧data packet to be sent. A condition: deficit value>0 is also possible.

If there is sufficient deficit the queue is set as active in box 5 and a packet is sent and the deficit value is decreased a corresponding amount in box 6.

If there is not sufficient deficit the queue is disabled in box 7.

Then the next queue of the order is picked in box 8 (whether or not the queue was empty or the queue had sufficient deficit). In other words, in the first round all the queues are polled and the flags are set as applicable.

If no queue at all has been set active, this procedure starts over again. This is tested in box 9. A special counter may be implemented to keep track of the number of active queues. The counter is incremented in box 5 and decremented in box 15 discussed below.

If any queue is active the procedure goes to box 10 in which the flag of the respective queue is tested. This means that local rounds are created as long as any queues are still active. Before entering box 10 the polling order may be changed. A possible new order would be to sort the queues according to the deficit value, so that queues with the highest deficit values are polled first. This would decrease the latency of queues with high deficit values. If the queue was empty in the last round, it means that the queue is still in the enabled state and will run through the same procedure as in the first round. If the queue is in the disabled state, the next queue will be picked without any further actions. It follows from the subsequent steps that queues are active until the deficit value is no longer sufficient or until the queue is empty.

If the queue is active the deficit value is tested again in box 11.

If the deficit is sufficient, the contents of the queue is tested in box 12. The queue may have become empty by sending a packet in box 6. Also, the queue may have received more data since sending the packet in box 6.

If the queue is not empty a packet is sent and the deficit value is decreased the corresponding amount in box 13. Then the next queue is picked.

If the deficit value was not sufficient in box 11, the queue is set as disabled in box 15. This is the case when the deficit value has been decreased in box 6 to a value, which is too low for sending any data. Then the next queue is picked.

If the deficit was sufficient in box 11 but the queue was empty in box 12, this means that there is no data to be sent, even if the queue would be permitted to send it. Then the queue is set as disabled in box 15. Otherwise the local round would never stop if a queue occasionally becomes empty and thus toggles between the enabled and active states. Then the next queue is picked.

An alternative less preferred way to solve this problem is to provide a fourth state which would have the same functionality as Enabled except that no weight is added to the deficit (compare box 3) and Active goes directly to this state instead of Disabled (compare box 15) when the queue is empty. This will decrease the latency of queues having so low intensity that they are occasionally completely empty. On the other hand, there is a risk of increasing the latency of heavily loaded queues.

Optionally, the deficit value is reset in box 14, shown in broken lines. Otherwise the deficit value would build up in an unfair way in relation to the other queues which would increase the burstiness.

It will be realized by a person skilled in the art that the invention may be implemented in various ways by hardware and software and described with different terminology without departing from the spirit of the invention. The invention is only limited by the claims below.

What is claimed is:

1. A scheduling method in a switch in which an input data stream is received and stored in a number of output queues, the scheduling method handling the output queues and comprising the steps of:

set a flag of all queues as a first value (enabled);

polling all queues in order;

if the polled queue contains data, refill a deficit value indicating a maximum amount of data that may be sent from this queue;

if the deficit-value permits, then set a flag of the queue as a second value (active), send data, and decrease the deficit value a corresponding amount for the polled queue, else set a flag of the queue as a third value (disabled);

if any queue is active after all the queues have been polled, go to a local round, else set a flag of all queues as a enabled and start polling the first queue of the order again.

2. The scheduling method of claim 1, wherein the local round comprises the steps of:

polling all queues in order;

if the polled queue is enabled, check for any data to be sent and refill the deficit value, if applicable, and set the flag to one of the three values as above, and send data, and decrease the deficit value a corresponding amount, if applicable;

if the polled queue is disabled, just poll the next queue;

if the polled queue is active, check the deficit, and if deficit value permits, check for any data to be sent and send data, and decrease the deficit value a corresponding amount, if applicable, else set the flag to the value disabled;

if any queue is active after all the queues have been polled, go to a new local round, else set a flag of all queues as a enabled and start polling the first queue of the order again.

3. The scheduling method of claim 2, wherein the deficit value is reset (to zero) if the polled queue is active, has sufficient deficit but the queue is empty.

4. The scheduling method of claim 1, wherein the deficit values to be assigned to the respective queues are weighted.

5. The scheduling method of claim 1, wherein the deficit value is compared with a constant, e.g. zero, to check if the deficit value permits sending of data.

6. The scheduling method of claim 1, wherein the deficit value is compared with a packet to be sent contained in the polled queue, to check if the deficit value permits sending of data.

7. The scheduling method of claim 1, wherein a counter is incremented when a queue is set as active, and decremented when a queue is changed from active to another state, in order to check if any queue is active.

8. The scheduling method of claim 1, wherein if all queues have been polled in a first order, the polling order is changed to a new order by sorting the queues according to the deficit value.

9. A scheduling device in a switch in which an input data stream is received in an enqueuer means and stored in a number of output queues, the scheduling device selecting data from the output queues to send, and comprising:

means for setting and keeping an order for polling the queues;

means for providing and storing a deficit for each queue, the deficit indicating the maximum amount of data which the queue may send;

means for providing a flag for each queue, the flag indicating if the queue can send data;

wherein the scheduling device is arranged to set a flag of all queues as a first value (enabled);

poll all queues in order;

if the polled queue contains data, refill the deficit value;

if the deficit value permits, then set a flag of the queue as a second value (active), send data, and decrease the deficit value a corresponding amount for the polled queue, else set a flag of the queue as a third value (disabled);

if any queue is active after all the queues have been polled, go to a local round, else set a flag of all queues as enabled and start polling the first queue of the order again.

10. The scheduling device of claim 9, wherein the scheduling device is arranged to perform the following steps in the local round:

polling all queues in order;

if the polled queue is enabled, check for any data to be sent and refill the deficit value, if applicable, and set the flag to one of the three values as above, and send data, and decrease the deficit value a corresponding amount, if applicable;

if the polled queue is disabled, just poll the next queue;

if the polled queue is active, check the deficit, and if deficit value permits, check for any data to be sent and send data, and decrease the deficit value a corresponding amount, if applicable, else set the flag to the value disabled;

if any queue is active after all the queues have been polled, go to a new local round, else set a flag of all queues as a enabled and start polling the first queue of the order again.

11. The scheduling device of claim 10, wherein the scheduling device is arranged to reset the deficit value (to zero) if the polled queue is active, has sufficient deficit but the queue is empty.

12. The scheduling device of claim 9, wherein the deficit values to be assigned to the respective queues are weighted.

13. The scheduling device of claim 9, wherein the scheduling device is arranged to compare the deficit value with a constant, e.g. zero, to check if the deficit value permits sending of data.

14. The scheduling device of claim 9, wherein the scheduling device is arranged to compare the deficit value with a packet to be sent contained in the polled queue, to check if the deficit value permits sending of data.

15. The scheduling device of claim 9, comprising a counter to be incremented when a queue is set as active, and decremented when a queue is changed from active to another state, in order to check if any queue is active.

16. The scheduling device of claim 9, wherein the scheduling device is arranged to change the polling order to a new order by sorting the queues according to the deficit value, if all queues have been polled in a first order.

17. A scheduling method in a switch in which an input data stream is received and stored in a number of output queues, the scheduling method handling the output queues and comprising the steps of:

polling all queues in order;

if the polled queue contains data, refill a deficit value indicating a maximum amount of data that may be sent from this queue;

if the deficit value permits, send data, and decrease the deficit value a corresponding amount for the polled queue, else disable the queue;

if any queue is permitted to send after all the queues have been polled, go to a local round, else start polling the first queue of the order again.

18. A scheduling device in a switch in which an input data stream is received in an enqueuer means and stored in a number of output queues, the scheduling device selecting data from the output queues to send, and comprising:

means for setting and keeping an order for polling the queues;

means for providing and storing a deficit for each queue, the deficit indicating the maximum amount of data which the queue may send;

wherein the scheduling device is arranged to;

poll all queues in order;

if the polled queue contains data, refill the deficit value;

if the deficit value permits, then send data, and decrease the deficit value a corresponding amount for the polled queue, else disable the queue;

if any queue is permitted to send after all the queues have been polled, go to a local round, else start polling the first queue of the order again.

* * * * *